June 23, 1959 R. O. CLARK 2,891,442
APPARATUS FOR DISPLAYING IMAGES OF A PLURALITY
OF OSCILLOGRAPHIC FILM RECORDS
Filed Jan. 5, 1956 4 Sheets-Sheet 1
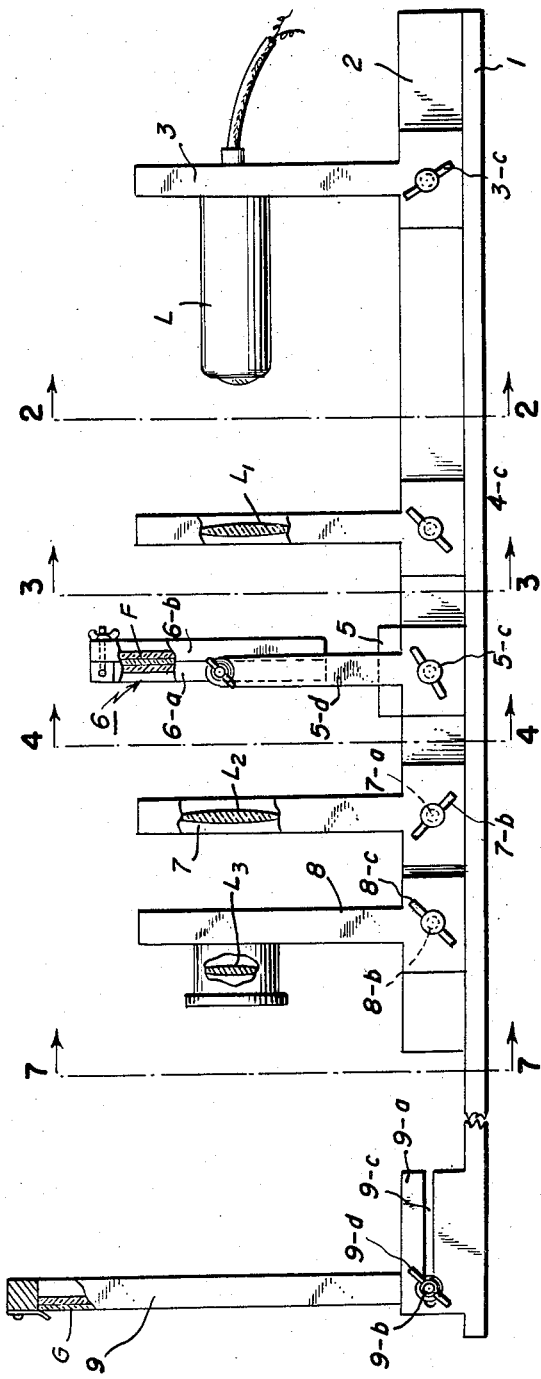
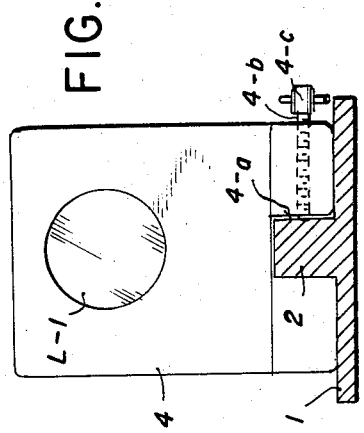
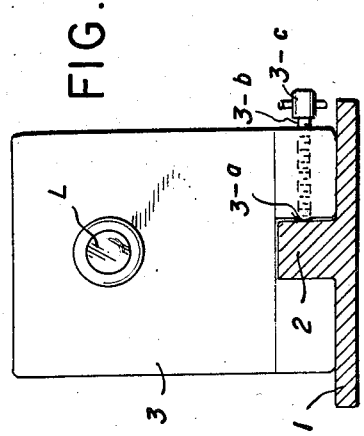
INVENTOR
ROBERT O. CLARK
BY Ogle R. Singleton
ATTORNEY

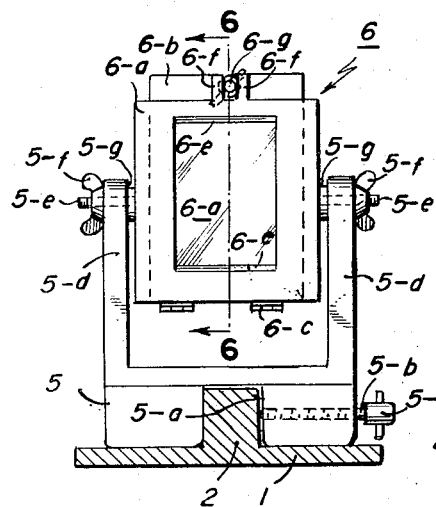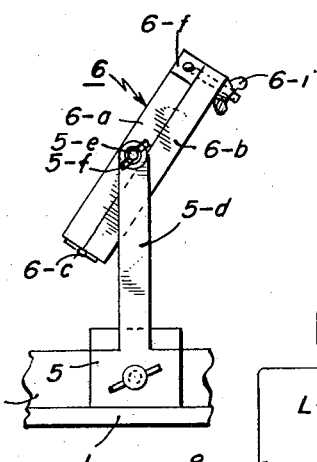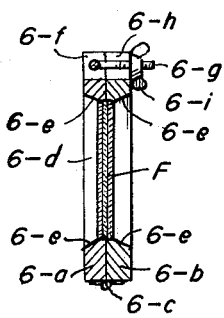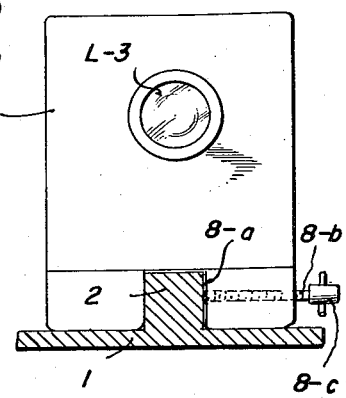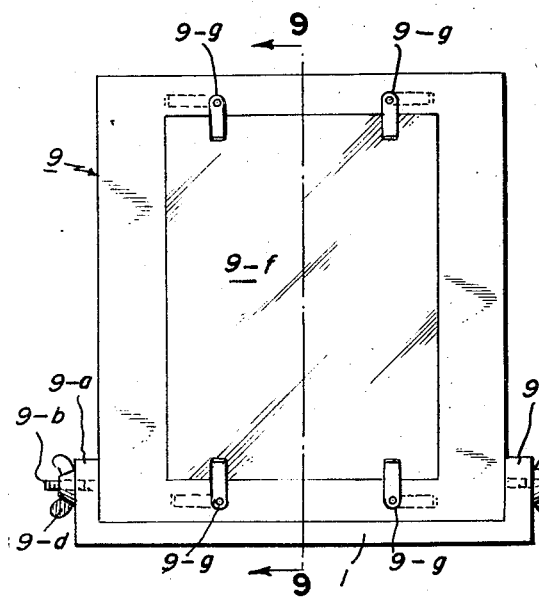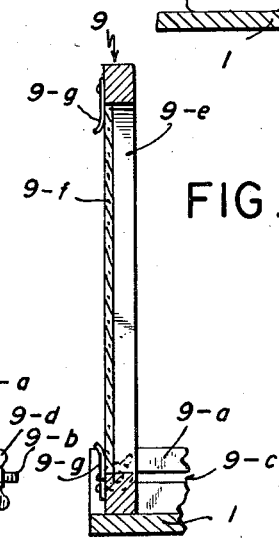

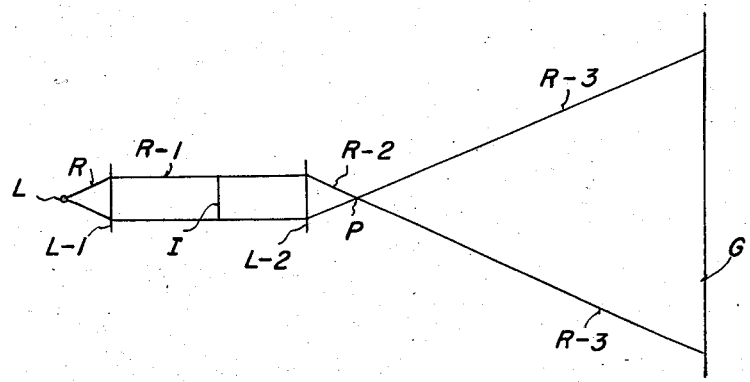
FIG. 10
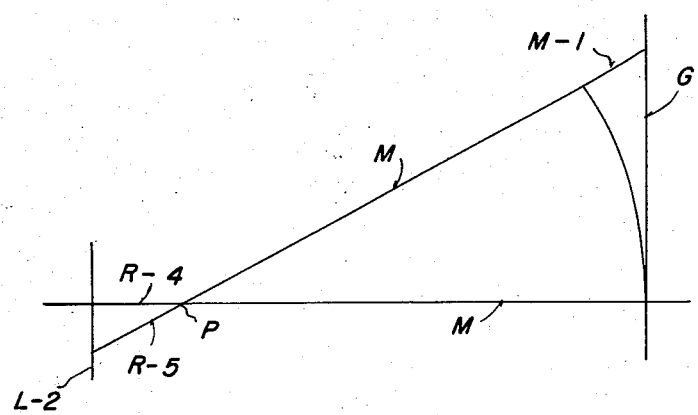
FIG. 11
FIG. 12
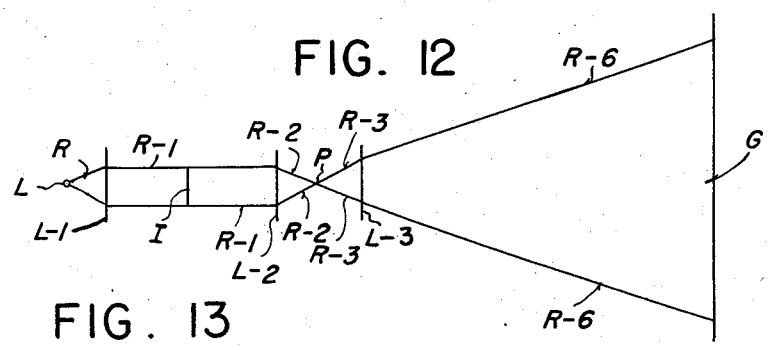
FIG. 13
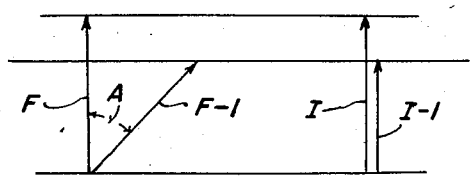
INVENTOR
ROBERT O. CLARK
BY Ogle R. Singleton
ATTORNEY June 23, 1959    R. O. CLARK    2,891,442
APPARATUS FOR DISPLAYING IMAGES OF A PLURALITY
OF OSCILLOGRAPHIC FILM RECORDS
Filed Jan. 5, 1956    4 Sheets-Sheet 4
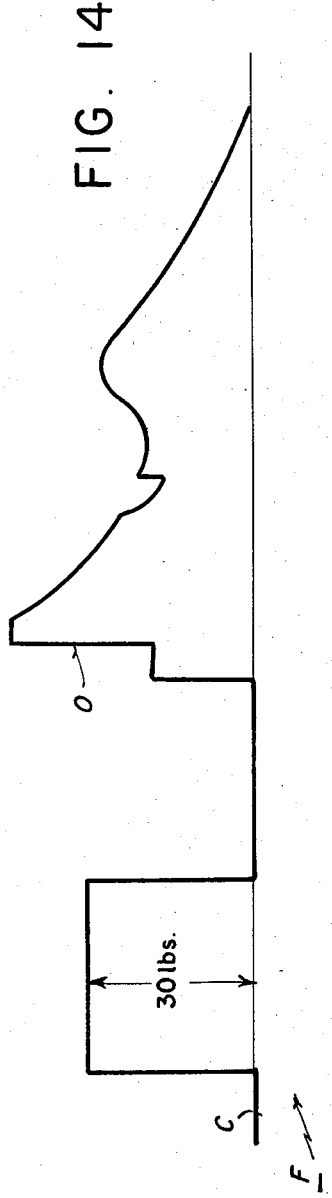
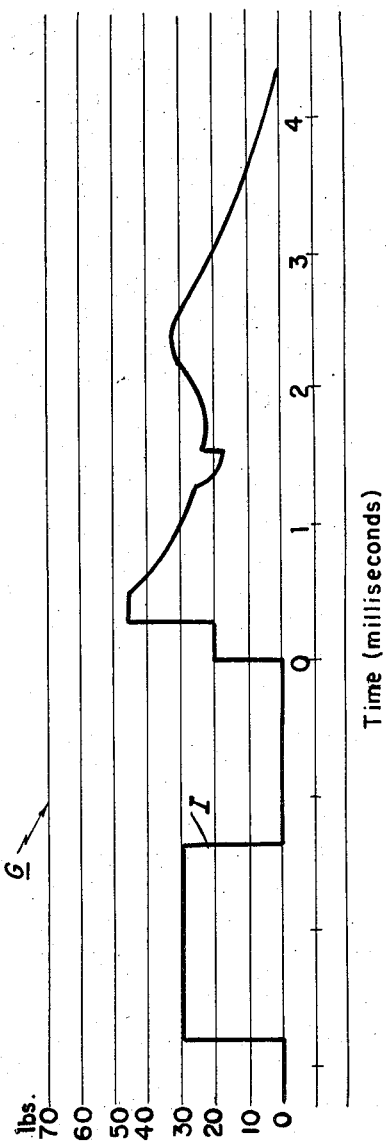
INVENTOR
ROBERT O. CLARK
BY *Ogle R. Singleton*
ATTORNEY United States Patent Office 2,891,442
Patented June 23, 1959

2,891,442
APPARATUS FOR DISPLAYING IMAGES OF A PLURALITY OF OSCILLOGRAPHIC FILM RECORDS

Robert O. Clark, Aberdeen, Md.

Application January 5, 1956, Serial No. 557,520

1 Claim. (Cl. 88—24)

My invention consists in a new and useful improvement in apparatus for displaying images of a plurality of oscillographic film records. In the recording of high speed physical phenomena, such as pressure (shock wave), light intensity (detonation flash) or temperature (jet engine exhaust), as a function of time, oscillographic film recordings are necessary. A means of normalizing the data from such oscillographic film records, easily and quickly, to standard scales is required. My improved method consists essentially in a novel method of projection of the images of these records, in such a manner as to fit such images to the standard scales. My improved apparatus provides one means for practicing such method.

The particularly novel feature of my improved method is the controlled variation in the height to width ratio of the image of each record, whereby the image of each record can be so projected as to conform precisely with a standard scale. Such variation is produced by the controlled inclination of the film record, for projection of its image on the standard scale.

While I illustrate in the drawings and hereinafter fully describe one specific embodiment of my invention, as to my improved apparatus, it is to be distinctly understood that I do not consider my invention, as to my improved apparatus, to be limited to said embodiment but refer for its scope to the claims appended hereto.

In the drawings:

Fig. 1 is a side elevation of my improved apparatus, a portion being broken away.

Fig. 2 is a vertical section on the line 2—2 of Fig. 1, in the direction of the arrows.

Fig. 3 is a vertical section in the line 3—3 of Fig. 1, in the direction of the arrows.

Fig. 4 is a vertical section on the line 4—4 of Fig. 1, in the direction of the arrows.

Fig. 5 is an end elevation of the film frame of Fig. 4 showing it tilted.

Fig. 6 is a vertical section on the line 6—6 of Fig. 4, in the direction of the arrows.

Fig. 7 is a vertical section on the line 7—7 of Fig. 1, in the direction of the arrows.

Fig. 8 is an end elevation of my apparatus.

Fig. 9 is a vertical section on the line 9—9 of Fig. 8, in the direction of the arrows.

Fig. 10 is a schematic diagram of the simple lens system of my apparatus.

Fig. 11 is a diagram showing the travel of the axial and peripheral rays.

Fig. 12 is a schematic diagram of the corrected lens system of my apparatus.

Fig. 13 is a diagram showing normal and tilted heights of the film.

Fig. 14 is a fragment of the film.

Fig. 15 is a fragment of the graph paper, having thereon a standard scale, showing inscribed thereon the projected image of the record of the film shown in Fig. 14.

As shown in the drawings (Figs. 1 to 9), my apparatus has a base 1 having an upstanding longitudinal flange 2 extending from one end of the base 1 to a point spaced from the other end. A frame 3 is slidably mounted on the base 1, having a recess 3–a in which is received the flange 2 and a locking bolt 3–b threaded in the plate 3 with a wing head 3–c on its end exterior the plate 3, for rotation of the bolt 3–b to engage the bolt 3–b with the flange 2 to lock the plate 3 in adjusted position relative the base 1. A lamp L is suitably mounted in the plate 3 (Fig. 2) and has suitable electrical conductors for energizing the lamp L. It is to be understood that the lamp L is of the type, such as a 25-watt zirconium arc lamp, to provide an excellent point source of light.

A frame 4, with parts 4–a, 4–b and 4–c, substantially identical with frame 3 and parts 3–a, 3–b and 3–c, is also slidably mounted on the base 1. A lens L–1 is suitably mounted in the frame 4 (Fig. 3). It is to be understood that the lens L–1 is a suitable, bi-convex, spherical lens.

A pedestal 5 is slidably mounted on the base 1, with parts 5–a, 5–b and 5–c, substantially identical with parts 3–a, 3–b and 3–c. The pedestal 5 has a pair of upstanding posts 5–d.

The film frame 6 (Figs. 4, 5 and 6) is pivotally mounted on these posts 5–d by horizontal pintles 5–e having wing nuts 5–f to engage the posts 5–d and washers 5–g interposed between the sides of the frame 6 and the posts 5–d. The frame 6 is composed of two leaves 6–a and 6–b connected at their lower ends by hinges 6–c, and having windows closed by panes 6–d of clear glass. It will be noted (Figs. 4 and 6) that the upper and lower edges 6–e of the windows flare outwardly. The leaf 6–a has a pair of upstanding lugs 6–f in which is pivoted a bolt 6–g received in a slot 6–h in the upper edge of the leaf 6–b, and having a lock nut 6–i threaded on its outer end for locking together the leaves 6–a and 6–b.

A frame 7 substantially identical with the frame 4 is slidably mounted on the base 1, with locking bolt 7–a and wing head 7–b for locking the frame 7 in adjusted position. The frame 7 has a suitable lens L–2 identical with lens L–1 suitably mounted therein.

A frame 8 (Fig. 7) substantially identical with frames 3, 4 and 7 is slidably mounted on the base 1, with parts 8–a, 8–b and 8–c similar to parts 3–a, 3–b and 3–c. A lens L–3 is suitably mounted in the frame 8. It is to be understood that the lens L–3 is a convex (positive) lens to correct distortion.

A frame 9, for supporting the graph paper, is slidably mounted on the base 1 between two lateral flanges 9–a projecting upwardly from the base 1 (Fig. 8). Bolts 9–b project from the lower ends of the sides of the frame 9, through open-end slots 9–c in the flanges 9–a, and have wing nuts 9–d threaded thereon, to lock the frame 9 in adjusted position relative the base 1. The frame 9 has an opening 9–e covered by a pane 9–f of clear glass. Clips 9–g are pivoted on the frame 9 for holding the graph paper on the pane 9–f.

I have illustrated diagrammatically (Fig. 10) the projection of the image I on the film to the graph paper G. The light rays R from the lamp L are projected by the lens L–1 as parallel rays R–1 which pass through the film, projecting the image I to the lens L–2 which produces rays R–2 which converge, cross at the focal point P and diverge as rays R–3 to project the image I on the graph paper G.

I have illustrated diagrammatically (Fig. 11) the distortion of the image I by the lens L–2. Since the axial ray R–4 travels through the path M from the focal point P to the graph paper G and the peripheral ray R–5 travels through the path M plus the path M–1, the portion of the image I produced on the graph paper G is slightly more magnified, producing distortion.

I have illustrated diagrammatically (Fig. 12) the method I employ for correcting this distortion. The correction lens L-3 is suitably disposed between the focal point P and the graph paper G, to nullify the path difference for all the rays R-3 composing the image I, by producing proper rays R-6.

I have illustrated diagrammatically (Fig. 13) the effect which I can produce by tilting the film on an horizontal axis. It is obvious that when the film F is vertically disposed, the image I will be projected, and when the film F-1 is tilted the image I-1 is projected, the degree of reduction in the height of the image depending upon the angle of tilt A.

I have illustrated (Fig. 14) a film F, for use in my apparatus, having a calibration mark C of the normal amplitude of 30 pounds, and an oscillographic record O.

I have illustrated (Fig. 15) a fragment of the graph paper G used in my apparatus showing the value in pounds of the several spaces thereon, and the image I of the calibration mark C and the record O, shown in Fig. 14, projected on the graph paper G.

Having described the structural details of my improved apparatus, I will now describe its use in the practice of my improved method.

To normalize the data of a set of oscallographic records on films, the pressure value represented by the calibration mark of each record is divided by the amount of the normal amplitude of its calibration mark. The largest quotient of the set indicates the record to which all the other records of the set are to be reduced.

The selected film F is placed in the film frame 6, by proper manipulation of the leaves 6-a and 6-b, and locked therein by the bolt 6-g and the nut 6-i. The frame 6 is vertically disposed and locked to posts 5-d. The graph paper G is placed in frame 9 and held therein by clips 9-g, the paper being on the outer side of the pane 9-f toward the adjacent end of the apparatus. The lamp L, lens L-1, lens L-2, lens L-3 and the frame 9 are then properly disposed on the base 1, by manipulation of their supporting media, to so relate the parts that the image of the record (Fig. 14) is properly projected on the graph paper G (Fig. 15), and the parts are then locked in adjusted positions. It is to be understood that the adjustment is such that the calibration mark C of the film F is registered with the lines of the graph paper G and that the paper G is sufficiently transparent for the image I to be visible on the outer face of the paper G. The image I is then traced by any suitable means on the paper G, and the film F removed from the frame 6.

When the next film F has been placed in the frame 6, as above described, all the parts being in statu quo, the frame 6 is released from the posts 5-d, tilted to the precise degree to register the calibration mark C of the image of that film F with the lines of the graph paper G, and locked in that position, and the image I is traced.

From the foregoing description of the use of my apparatus, the essential features of my improved method can be understood. As above pointed out, its novel feature is the controlled variation in the heighth to width ratio of the image of each record, whereby each image can be so projected as to conform precisely with a standard scale. As above described, such variation is produced by tilting the film F in the frame 6 to the precise degree required to register the calibration mark C of the film F with the lines of the standard scale of the graph paper G.

It is obvious that, if desired, the variation in the heighth to width ratio of the image can be produced by moving the film F about its vertical axis instead of about its horizontal axis as above described, or by contemporaneous movement about both axes. It is believed that the modification of my improved apparatus to adapt it for such use is obvious.

Having described my invention, what I claim is:

In a projection apparatus for displaying images of a plurality of oscillographic film records to obtain images of desired dimensions, each film record having a calibration mark thereon, the combination of an elongated base; a lamp on said base adapted to produce substantially a point source of light; a spherical lens on said base adjacent said lamp and in alignment with said source of light to project parallel light rays; a pedestal; a film frame pivotally mounted on said pedestal on an axis substantially perpendicular to the projection axis and comprising two leaves having transparent windows hingedly connected for holding a film therebetween, said pedestal being mounted on said base so that said light rays pass through said film record in said frame; a second spherical lens, identical with said first lens, and mounted on said base so that said light rays pass through the film record and pass through said second lens; a convex positive lens mounted on said base to correct distortion of said rays passed through said second lens; a graph paper constituting a projection screen and having thereon a linear scale of calibration marks; a frame adapted to support said graph paper, said frame being mounted on said base so that said light rays passed through said convex positive lens impinge upon said graph paper supported by said frame to produce the desired image; and supporting flange means on said base for said lamp and lenses, said supporting flange means, pedestal and frame being mounted on said elongated base for longitudinal adjustment thereof.

References Cited in the file of this patent

UNITED STATES PATENTS

| | | |
|---|---|---|
| 1,291,274 | Ubelmesser | Jan. 14, 1919 |
| 1,426,722 | Evans | Aug. 22, 1922 |
| 1,651,574 | Beechlyn | Dec. 6, 1927 |
| 1,652,271 | Cooke | Dec. 13, 1927 |
| 2,072,286 | Wellington | Mar. 2, 1937 |
| 2,153,901 | Thomas | Apr. 11, 1939 |
| 2,187,803 | Griffin | Jan. 23, 1940 |
| 2,409,603 | Wood | Oct. 15, 1946 |
| 2,420,316 | Hine | May 13, 1947 |
| 2,448,568 | Zwillinger et al. | Sept. 7, 1948 |
| 2,510,998 | O'Brien | June 13, 1950 |
| 2,787,935 | Inoue | Apr. 9, 1957 |